INVENTOR:
Fred E. Baker

United States Patent Office 3,215,924
Patented Nov. 2, 1965

3,215,924
VEHICLE ELECTRICAL SYSTEM
Fred E. Baker, Rte. 1, Box 808, Clark County,
Ridgefield, Wash.
Filed Apr. 16, 1962, Ser. No. 187,823
6 Claims. (Cl. 320—68)

The present invention relates to a vehicle electrical system which includes a battery, and an alternating current generator operable for maintaining the charge on the battery.

Conventional vehicle electrical systems utilize a battery, a direct current generator for maintaining the charge on the battery, and a voltage regulator for controlling the generator action. Such systems are only capable of serving loads at the usual vehicle voltages such as 8 volts D.C. or 12 volts D.C.

There has been a steadily increasing demand, however, for additional operating accessories on vehicles. This has been particularly true in the case of special purpose vehicles such as ambulances and police cars where the need for high power electrical accessories has been definitely established. In such vehicles it has therefore become a practice to install in addition to the conventional D.C. generator, an A.C. generator capable of serving loads at the conventional household voltage level of 110 volts.

The main object of the present invention is to provide an improved vehicular electrical system for serving both alternating current and direct current loads.

Another object of the invention is to provide such a system in which the conventional combination of a direct current generator and an alternating current generator is replaced by an alternating current generator only.

Figure 1:
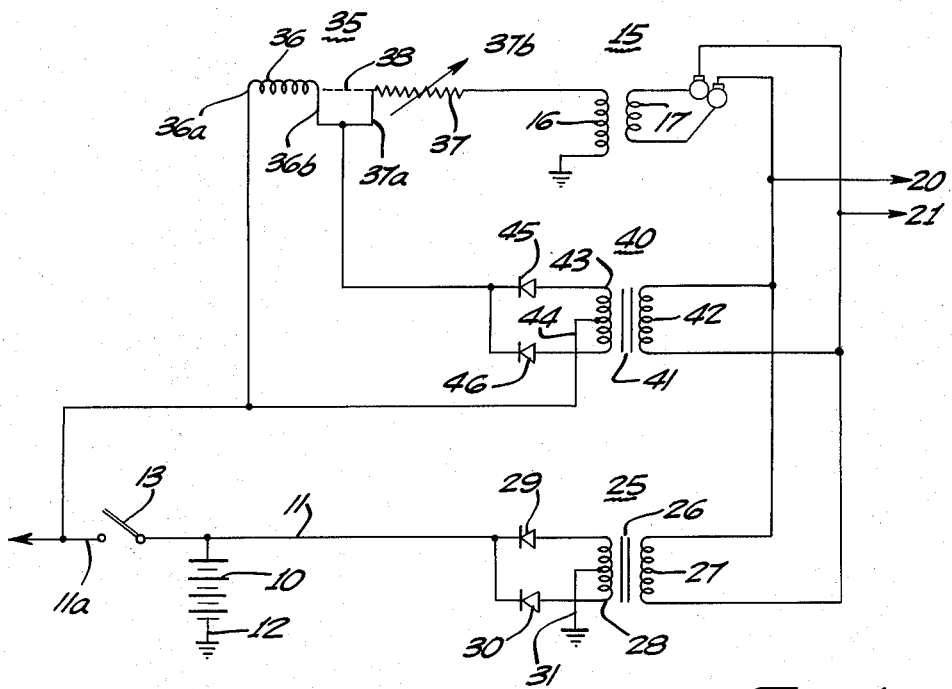
Figure 2:
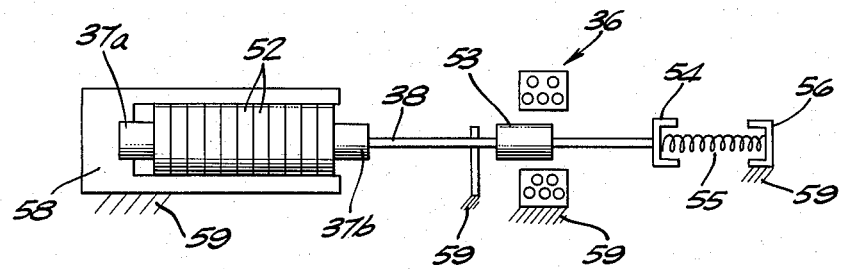

The objects and advantages of the invention will be more fully apparent from the following description considered in conjunction with the accompanying drawing, in which:

FIG. 1 is a schematic diagram of a vehicle electrical system in accordance with the invention; and FIG. 2 is a longitudinal cross-sectional view showing the mechanical construction of the voltage regulator.

Referring now to FIG. 1 of the drawing it will be seen that the main components of the electrical system are a battery 10, an alternating current generator 15, a power pack 25, a voltage regulator 35, and a booster 40. The alternating current generator 15 is rotatably driven from the vehicle engine and provides output energy at 110 volts A.C. which may be utilized for accessories requiring that operating voltage. The generator output voltage is also supplied to the power pack 25 which reduces it to a lower value, rectifies it, and then supplies the rectified voltage to battery 10 for maintaining the charge level thereof. Battery 10 which has a nominal voltage of 12 volts supplies current through the voltage regulator 35 to the field winding of the alternating current generator, the magnitude of the current thus supplied to the generator field being controlled by the voltage regulator. The voltage regulator 35 in turn receives its control voltage from the booster 40, which is driven from the generator output. Booster 40 besides controlling the voltage regulator performs the additional function of providing a rectified voltage which is derived from, and proportional to, the generator output voltage, and which is supplied to the voltage regulator in such a way as to be added to the battery voltage for energizing the field winding of the generator.

Tracing the circuit connections it will be seen that the battery 10 has its positive terminal connected to a lead 11 while its negative terminal is grounded at 12. A lead 11a is separated from the lead 11 by the ignition switch 13, and is therefore energized only when the ignition switch of the vehicle is turned on. Alternating current generator 15 has its field winding designated as 16 and armature winding 17. The two ungrounded leads of the A.C. system are designated as 20 and 21, respectively, and are coupled to the respective ends of armature winding 17 for receiving energy therefrom.

Power pack 25 includes a transformer 26 having a primary winding 27 and a secondary winding 28. The secondary winding 28 has a center tap that is connected to ground at 31. Diodes 29 and 30 have their anodes connected to respective ends of the secondary winding 28, while the cathodes of both diodes are connected to each other and to the positive lead 11 in the direct current system. The voltage transformation ratio of the transformer 26 is such that when its primary winding is energized at 110 volts A.C. the rectifier circuit just described delivers a D.C. voltage of approximately 14.5 volts to the battery 10 for restoring the charge thereof.

Voltage regulator 35 includes a voltage coil 36 and a variable resistor 37. Lead 11a is connected to one end 36a of the voltage coil; the other end 36b of the voltage coil is connected to one end 37a of the resistor; and the other end 37b of the resistor is connected to one terminal of the generator field winding 16 whose other terminal is grounded. The D.C. resistance of voltage coil 36 is nominal, and it will therefore be seen that the voltage of battery 10 is impressed across the variable resistor 37 and the field winding 16 in series, with the proportion thereof that is received by the field winding 16 being governed by the action of the voltage coil. A mechanical linkage, by means of which the voltage coil 36 controls the resistance value of the variable resistor 37, is indicated at 38.

Booster 40 includes a transformer 41 having a primary winding 42 and a secondary winding 43. The secondary winding has a center tap which is connected at 44 to the lead 11a of the direct current system. Diodes 45 and 46 have their anodes connected to the respective ends of winding 43, the cathodes of these two diodes being connected to each other and to the juncture of the coil end 36b and resistor end 37a in the voltage regulator. It will thus be seen that a rectified output voltage is provided between the center tap connection 44 and the cathodes of the diodes 45 and 46, this rectified output voltage being applied directly across the two ends of the voltage coil 36 of the regulator. The voltage transformation of transformer 41 is such that when the A.C. system is operating at 110 volts, the D.C. voltage applied across the voltage coil 36 is approximately 5 volts.

In the voltage regulator the variable resistor 37 is normally set at its minimum resistance value. When a small amount of voltage is applied to the voltage coil 36 it has no effect on the value of resistor 37, because of a bias setting on the mechanical linkage means 38. However, when the voltage applied to coil 36 reaches a predetermined value, the bias setting of the linkage 38 is overcome, and further increases in the coil voltage thereafter cause the resistance of the variable resistor 37 to progressively increase. The bias setting of the linkage 38 is preferably established at a value corresponding to the normal voltage in the A.C. system. Therefore, until the generator output voltage rises to the predetermined normal operating voltage level in the A.C. system, the resistance of resistor 37 is at a minimum, permitting maximum field current to flow. However, when the nominal A.C. system voltage level is reached, the resistance value of resistor 37 progressively increases at a rather rapid rate, so as to inhibit any substantial excess voltage from developing in the A.C. system. In fact, as the A.C. voltage rises above 110 volts, and the sum of the battery voltage and rectified voltage across coil 36 continues to increase, the generator field current nevertheless decreases.

movable metallic plate 37b engaging the other end. A shaft 38 has one end fastened to the movable plate 37b, the shaft being aligned with the longitudinal axis of the stack and extending outwardly from one end thereof. An end cap 54 carried by the outer end of shaft 38 receives an expansible spring 55, the other end of the spring being contained within a fixed support device 56. Thus, the expansive force of the spring normally biases shaft 38 so as to obtain maximum compressive force between the movable plate 37b and fixed plate 37a, keeping the resistance of the stack of carbon discs as measured between the plates 37a and 37b at a minimum value. The stack of discs is contained in an insulating housing 58, and various fixed supports are indicated at 59.

Shaft 38 also carries a solenoid plunger 53 which is rigidly affixed thereto. The voltage coil 36 of the regulator is in the form of a solenoid coil which surrounds the plunger 53. It will be seen that the longitudinal center of the solenoid coil 36 is displaced from the longitudinal center of plunger 53, in a direction away from the stack of carbon discs. Energization of solenoid coil 36 tends to pull the plunger 53 away from the stack of carbon discs, thus lessening the pressure between the discs and the stack and thereby increasing the total effective resistance of the stack.

It will be noted that not only does the spring 55 oppose the motion of shaft 38 away from the stack of carbon discs, but the spring 55 is biased so as to exert positive force upon the shaft to push it toward the stack. Initial energization of the solenoid coil 36 does not overcome the spring bias, and has no substantial effect upon the resistance value of the stack. When the biasing force of the spring is overcome the additional energization of the solenoid coil 36 causes the shaft 38 to pull the movable plate 37b away from the stack. At this point the rate of increase of the effective series resistance of the stack is very large compared to the rate of increase of voltage applied to the solenoid coil 36. Thus the initial increase of voltage applied to the solenoid coil causes little or no increase in the resistance value of variable resistor 37, but after the voltage applied to the voltage coil 36 reaches a certain value the additional increments of the voltage cause very large increments in the resistance value.

Thus it will be seen that the battery 10 is relied upon only to initiate the operation of the alternating current generator 15, and as the motor speed increases and the generator output voltage picks up accordingly, the energy fed back through the booster 40 serves to add a substantial increment to the battery voltage for purposes of energizing the field winding of the generator. In this fashion the desired output potential of 110 volts is achieved at a relatively slow engine speed. As the engine speed increases still further, however, the voltage fed back through booster 40 to voltage coil 36 and the voltage regulator 35 becomes sufficient to overcome the bias setting of the spring 55, and thereafter the resistance value of the variable resistor 37 increases so rapidly as a function of generator output voltage as to inhibit any substantial further increase in the generator output voltage.

While the present invention is illustrated as utilizing two transformers it is evident that a single transformer having two secondary windings may be utilized equally well. An advantage of having the power pack 25 separated from the booster 40, however, is that when the vehicle is in the garage the primary winding 27 of transformer 26 may be connected to a standard 110 volt A.C. circuit for purposes of recharging the battery.

regulator utilizes mechanical means for varying the value of the variable resistor, it will also be evident that electrical means may be utilized if desired. That is to say, a transistor or vacuum tube may be utilized as the primary element of the voltage regulator 35, by permitting the field winding current to pass directly through the main current path of the device, and a control voltage for the device is then obtained from the booster 40 as a function of the generator output voltage.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A vehicle electrical system comprising, in combination:
    an alternating current generator adapted to be rotatably driven by the vehicle engine, and having separate field and armature windings;
    a battery;
    first transformer and rectifier means coupled to said armature winding and to said battery, and operable in response to a predetermined level of output voltage of said generator for charging said battery to a predetermined charging level;
    a voltage regulator including a voltage coil and a variable resistor;
    circuit means coupling said battery, said variable resistor and said field winding in a series loop circuit;
    second transformer and rectifier means coupled to said armature winding and to said voltage coil and operable for energizing said voltage coil in proportion to the value of the generator output voltage;
    said voltage regulator including means responsive to the energization of said voltage coil for increasing the resistance of said variable resistor.

2. An electrical system as claimed in claim 1 wherein said variable resistor has a fixed minimum value for all values of generator output voltage less than said predetermined output voltage level, said voltage regulator being operable to increase the resistance value of said resistor only when the output voltage of said generator increases above said predetermined output voltage level.

3. An electrical system as claimed in claim 2 wherein said voltage regulator includes a stack of carbon discs forming said variable resistor, electrical connections at the ends of said stack, spring means normally compressing said stack together for maintaining a minimum resistance value thereof between said electrical contacts, and a solenoid plunger actuable by said voltage coil for relieving the pressure on said stack in opposition to said spring means whenever the output voltage of said generator increases above said predetermined output voltage level.

4. A vehicle electrical system comprising, in combination:
    an alternating current generator adapted to be rotatably driven by the vehicle engine, and having separate field and armature windings;
    a battery;
    transformer means coupled to said armature winding, and including first and second secondary windings;
    first rectifier means coupled in a series loop circuit with said battery and said first secondary winding;
    a voltage regulator including a voltage coil, a variable resistor normally having a minimum resistance value, and control means selectively responsive to energization of said voltage coil for increasing the resistance value of said variable resistor;

second rectifier means coupled in a series loop circuit with said voltage coil and second secondary winding;

and means for selectively connecting one end of said voltage coil to the positive terminal of said battery, said variable resistor being interconnected between the other end of said voltage coil and one end of said field winding, the other end of said field winding being connected to the negative terminal of said battery;

the operation being such that a rectified voltage supplied through said second rectifier means is added to the voltage of said battery for energizing said generator field winding;

said control means of said voltage regulator having a bias setting such that no change in the resistance value of said variable resistor is effected until the output voltage across said armature winding reaches a predetermined value, but when the output voltage of said armature winding rises above said predetermined value and the sum of said battery voltage and the voltage supplied by said second rectifier means increases, the action of said voltage regulator being such that the voltage across said field winding nevertheless decreases.

5. In a vehicle electrical system including an alternating current generator having separate field and armature windings, which is rotatably driven by the vehicle engine, and characterized by an output voltage that is approximately proportional both to the amplitude of the field current and to the speed of rotation of the generator, the combination comprising:

a voltage regulator including variable resistance means, a voltage coil, and mechanical means actuable upon energization of said voltage coil for increasing the resistance value of said variable resistance means;

means coupling the vehicle battery, said voltage coil, said variable resistance means, and the field winding of the generator together to form a first series loop circuit;

a first transformer having its primary winding coupled to the armature winding of the generator;

rectifier means coupling said voltage coil, and the secondary winding of said transformer, together to form a second series loop circuit;

and a second transformer having its primary winding coupled to the armature winding of the generator, its secondary winding being coupled through additional rectifier means to the vehicle battery for charging the same;

the circuit action being such that the output of said first transformer is fed back to increase the generator output voltage at low generator speeds, and to decrease it at high generator speeds.

6. In a vehicle electrical system including an alternating current generator having separate field and armature windings which is rotatably driven by the vehicle engine and characterized by an output voltage that is approximately proportional both to the amplitude of the field current and to the speed of rotation of the generator, the combination comprising:

means coupling the vehicle battery in a series loop circuit with said resistor and the field winding of said generator;

energizing means for applying to said voltage coil a voltage that is proportionate to the output voltage of said generator, said energizing means including a transformer having its primary winding coupled to the generator output, and rectifier means coupled in a series loop circuit with the secondary winding of said transformer and with said voltage coil;

said secondary winding of said transformer having a center tap, said rectifier means including a pair of diodes whose anodes are connected to respective ends of said secondary and whose cathodes are connected together and to one end of said voltage coil;

and which further includes switch means for selectively coupling the positive output terminal of the vehicle battery to said center tap and to the other end of said voltage coil;

said resistor normally having its minimum resistance value until the output voltage of the generator rises to a predetermined level, said voltage regulator being operable to progressively increase the resistance value of said resistor in response to increases in the output voltage of the generator above said predetermined level.

References Cited by the Examiner

UNITED STATES PATENTS

| | | | |
|---|---|---|---|
| 1,413,390 | 4/22 | Churchward | 338—103 X |
| 1,862,428 | 6/32 | Riotte | 338—101 |
| 1,924,193 | 8/33 | Livingston | 320—70 |
| 2,000,675 | 5/35 | Terry | 320—70 |
| 2,502,489 | 4/50 | Sparklin | 338—101 |
| 2,738,457 | 3/56 | Gilchrist | 322—82 X |
| 3,123,763 | 3/64 | Kettler | 323—22 |

LLOYD McCOLLUM, *Primary Examiner.*